(12) United States Patent
Kerekes et al.

(10) Patent No.: US 7,339,712 B2
(45) Date of Patent: Mar. 4, 2008

(54) LASER SCANNING AND POWER CONTROL IN A RAPID PROTOTYPING SYSTEM

(75) Inventors: Thomas A. Kerekes, Calabasas, CA (US); Jouni P. Partanen, Santa Monica, CA (US)

(73) Assignee: 3D Systems, Inc., Rock Hill, SC (US)

( * ) Notice: Subject to any disclaimer, the term of this patent is extended or adjusted under 35 U.S.C. 154(b) by 292 days.

(21) Appl. No.: 11/087,286

(22) Filed: Mar. 22, 2005

(65) Prior Publication Data

US 2006/0215246 A1 Sep. 28, 2006

(51) Int. Cl.
*G02B 26/08* (2006.01)
(52) U.S. Cl. ..................................... 359/201
(58) Field of Classification Search ............... 359/201, 359/202
See application file for complete search history.

(56) References Cited

U.S. PATENT DOCUMENTS

| | | |
|---|---|---|
| 4,863,538 A | 9/1989 | Deckard |
| 5,014,207 A | 5/1991 | Lawton |
| 5,017,753 A | 5/1991 | Deckard |
| 6,085,122 A | 7/2000 | Manning |
| 6,151,345 A | 11/2000 | Gray |
| 6,177,648 B1 | 1/2001 | Lawson et al. |

OTHER PUBLICATIONS

European Search Report EP 1705616 A1 dated Jun. 29, 2006 for European application EP06005544, pp. 21-23.
Office Action from German Patent Office for DE 10 2006 012 442.1-34 dated Aug. 21, 2007.

*Primary Examiner*—Euncha P. Cherry
(74) *Attorney, Agent, or Firm*—Summa, Allan & Additon, P.A.

(57) ABSTRACT

A laser scanning system in a rapid-protyping system is controlled during vector scanning by providing a commanded-position signal to each of first and second rotary motive devices to rotate respective mirrors of the scanning system, each mirror undergoing acceleration at the beginning of the vector, wherein the commanded-position signals are calculated based on physical mathematical modeling of the acceleration of the mirrors taking into account effects of inertia of the scanning system, and wherein actual positions of the mirrors are measured with fast-response devices and digital feedback control of the mirror positions is employed at a periodic rate sufficiently small to maintain a following error of the laser spot less than about 200 μs at all times. A laser power control method employs a fast-response power meter for measuring laser power.

36 Claims, 5 Drawing Sheets

LASER SCANNING AND POWER CONTROL IN A RAPID PROTOTYPING SYSTEM

BACKGROUND OF THE INVENTION

The present invention relates generally to rapid-prototyping systems such as stereolithography and laser-sintering systems. The invention more particularly relates to the control of a laser scanning system during vector scanning.

Rapid prototyping and manufacturing (RP&M) is the name given to a field of technologies that can be used to form three-dimensional objects rapidly and automatically from computer data representing the objects. In general, rapid prototyping and manufacturing techniques build three-dimensional objects, layer-by-layer, from a working medium utilizing sliced data sets representing cross-sections of the object to be formed. Typically an object representation is initially provided by a Computer Aided Design (CAD) system. RP&M techniques are sometimes referred to as solid imaging and include stereolithography, ink jet printing as applied to solid imaging, and laser sintering.

A laser sintering apparatus dispenses a thin layer of heat-fusible powder, often a heat-fusible polymer powder, polymer coated metal, or ceramic, across a process chamber to create a bed of the powder. The laser sintering apparatus then applies thermal energy to melt those portions of the powder layer corresponding to a cross-section of the article being built in that powder layer. The article is formed within a mass of powder commonly referred to as the "part cake." Lasers typically supply the thermal energy through modulation and precise directional control to a targeted area of the powder layer. Conventional selective laser sintering systems, such as the Vanguard system available from 3D Systems, Inc., use a carbon dioxide laser and position the laser beam using a scanning system having galvanometer-driven mirrors that deflect the laser beam.

There are two types of laser scanning commonly performed in rapid-prototyping systems: raster scanning and vector scanning. In raster scanning, the laser beam is scanned sequentially along a series of straight lines that are spaced apart and parallel to one another and that are relatively long (typically at least as long as the outside dimension of the part being fabricated in the scanning direction); thus, the laser beam has to move in only one direction along each scan line, and the scanning system typically is arranged such that the movement along each scan line is effected by movement of a single mirror. In vector scanning, the laser beam is scanned sequentially along a series of straight lines or vectors whose lengths can vary from very short (less than 1 mm) to relatively long, and whose orientations relative to one another can vary, such that in general it requires coordinated movement of two mirrors to scan a vector. The ending point of one vector often coincides with the starting point of the next vector. The present invention is concerned in particular with vector scanning, which has challenges that generally do not come into play in raster scanning.

Most of the commercially available vector scanners comprise two mirrors each mounted on the shaft of a galvanometer. In addition to galvanometers, brushless motors can be used to turn the shafts on which the mirrors are attached. A laser beam is reflected by the mirrors one after the other and then onto the working surface of a heat-fusible material in the rapid prototyping apparatus. Typically, the two mirrors are positioned above the working surface and the focused laser beam proceeds vertically downward onto the working surface. The galvanometric scanning mirrors are positioned so that when each of the shafts turns on its axis the two mirrors move the focused laser spot on the working surface. The two mirrors are arranged so that they move the spot in two orthogonal directions.

The laser scanners have also angular encoders attached to shafts. The angular encoders measure the change in angle of each shaft. Typically, special capacitors are used as angular encoders. When the angle of the shaft changes, the capacitance changes linearly with the angle. The encoder circuitry converts the values of capacitance values to voltages. Optical encoders have a similarly linear and monotonic encoder response curve.

The monotonic response voltage versus angle leads to problems in high-speed, high-resolution applications. In typical high-resolution scanner applications, 5 µRad angular resolution is expected. Typically, 5 µRad angular resolution may correspond to about 125 µV encoder signal. Thus, in order to achieve a high angular resolution the encoder electronics have to be able to separate voltage levels at about 100 µV accuracy. Moreover, this 100 µV accuracy needs to be achieved in a few tens of microseconds. It is very difficult to design a practical encoder circuitry that can resolve 100 µV in a few tens of microseconds. Thus, most commercial scanning systems are not able to measure the position of a scanning mirror to a high accuracy while the mirror is moving; accuracy is achieved only when the mirror is stationary.

In rapid prototyping applications, the scanning mirrors can vary in size and mass depending upon the particular application. In some cases, the mirrors can be relatively large and accordingly can have substantial mechanical inertia. The scanning system also has electrical inertia as a result of the inductance of the galvanometers or motors used for moving the mirrors. Consequently, it can take a considerable period of time to accelerate the scanning mirrors to their full speed. It has been found that ignoring the finite acceleration period of the mirrors can in some cases lead to unacceptably large following errors of the laser spot.

A further difficulty associated with rapid prototyping systems is the control of the laser power. It is generally desired to deliver a predetermined exposure (i.e., energy per unit area) pattern on the working surface. In the simplest case, the preferred exposure pattern is constant exposure inside the part and zero exposure outside the part. In many practical cases, however, the preferred exposure pattern is not a uniform pattern. For example, higher exposure at the border of exposed area will be often beneficial. At any rate, generally there is a predetermined optimum exposure for the various regions of a part being built, and it is desired to regulate the laser power so as to achieve the optimum exposure as closely as possible.

If the velocity of the laser spot is varying, a constant exposure along the vector to be scanned can be achieved by varying the laser power proportional to the speed of the laser spot. This is described in U.S. Pat. No. 6,085,122, the disclosure of which is incorporated herein by reference.

In order to control the exposure accurately, it is necessary to accurately control the scanning speed and the laser power. Typically, the power can be controlled by varying the excitation of the laser gain medium. For example, in the case of RF-excited $CO_2$ lasers used in laser sintering, the RF power to the laser can be pulse-width modulated. Alternatively, the power can be controlled by letting the laser run at constant power and attaching a power modulator into the laser beam before the scanning mirrors. For example, an acousto-optic modulator (AOM) can be used for this purpose.

In practical applications, the power is measured in steady state conditions by applying different levels of modulation and measuring the laser power after the laser has reached the steady state condition. In this way, the functional relation between the modulation level and steady state laser power is established and stored in the laser power control system. This functional relation is called the power calibration curve. The power calibration curve is then used in order to achieve a constant exposure along the vector. At each control step, the laser spot velocity is determined and the power calibration curve is used to evaluate what level of power modulation is needed to make the laser power proportional to the laser spot velocity.

The approach described above assumes that the dynamic response of the laser power control can be ignored. Unfortunately, it is very important to consider the dynamic response of the laser when controlling the laser power by varying excitation of the laser medium. For example, it takes about 100 microseconds ("µs") for a $CO_2$ laser of the type used in laser sintering to reach its full power after it has been turned on, and it takes even longer to reach steady state power at low pulse-width modulation. Typical scanning mirror acceleration times are a few hundred microseconds to about a millisecond, as previously noted. If the dynamic response is not taken into account, the exposure will not be uniform all along the vectors. The beginnings of vectors will be underexposed and the ends will be overexposed.

BRIEF SUMMARY OF THE INVENTION

The present invention addresses the above needs and achieves other advantages. In a first aspect of the invention, there is provided a method for vector-scanning a laser beam, comprising the steps of:

directing a laser beam from a laser light source onto a scanning system comprising a first mirror coupled with a first rotary motive device for positioning the first mirror, the laser beam being directed from the first mirror onto a second mirror of the scanning system and then onto a working surface, the second mirror being coupled with a second rotary motive device for positioning the second mirror; and scanning the laser beam along a vector by providing a commanded-position signal to each of the first and second rotary motive devices to rotate the respective mirrors, each mirror undergoing acceleration at the beginning of the vector, wherein the commanded-position signals are calculated based on physical mathematical modeling of the acceleration of the mirrors taking into account effects of mechanical and electrical inertia of the scanning system.

In one embodiment of the invention, the commanded-position signals are calculated using predicted positions that are calculated by modeling the acceleration a(t) of the mirrors as a function of time according to the equation $a(t)=a_0+Jt,$ where $a_0$ is the acceleration at time t=0 (i.e., the time at the beginning of the current time interval), and J is a predetermined function whose magnitude varies during the acceleration of the mirrors.

In preferred embodiments of the invention, the predetermined function J is a piecewise function having different functional definitions in different time intervals during the mirror acceleration. For example, in one embodiment J is a positive constant $J_1$ during a first time interval (e.g., from time "zero" at the beginning of the acceleration up to a time $T_1$), and in a subsequent second time interval ($T_1$ to $T_2$) the value of J is a negative constant $J_2$. After time $T_2$, the value of J is zero, and the mirror acceleration is zero (i.e., the mirror is at constant velocity).

Based on the modeled accelerations of the mirrors, predicted mirror velocities and positions can be calculated for any time during each time interval. The scanning system advantageously is controlled by a controller comprising a microprocessor, preferably a digital signal processor (DSP), in such a manner that the "following error" of the laser spot along the working surface is always less than about 200 µs, more preferably less than about 100 µs, and still more preferably less than about 50 µs and ideally is as close to nominally zero as possible. To this end, the controller determines the predicted acceleration, velocity, and position of each mirror at a periodic rate (e.g., every 15 µs, referred to herein as the "tick time"). Additionally, the actual positions of the mirrors at each "tick" are measured using fast-response devices such as interferometric encoders. A position error is determined for each mirror, and the scanning system is controlled to drive the position errors toward zero. In preferred embodiments, the controller operates using feedback control in the digital domain (e.g., the controller can comprise a DSP).

The invention also encompasses pre-analyzing a series of vectors to be scanned so as to determine, prior to the beginning of scanning, suitable control parameters for the scanning. For example, when the mirror accelerations are modeled using the piecewise J function as noted above, the pre-analysis can comprise determining suitable values of $J_1$, $J_2$, $T_1$, and $T_2$ for each vector to be scanned. The control parameters are stored in a memory of the controller. In the pre-analysis, vectors having a length greater than a predetermined value can be analyzed using a different physical mathematical modeling from that used for vectors having a length less than the predetermined value. For example, some vectors may be very short such that the mirrors never reach a constant velocity during the vector scan, whereas for longer vectors the mirrors have a constant-velocity phase of movement during the scan. The modeling can be different in each case.

In another aspect of the invention, there is provided a method for controlling the amount of laser energy to which a working surface of a heat-fusible material is exposed in a rapid prototyping system. The method is particularly useful in laser scanning systems in which the mirrors have an acceleration time less than about 1 millisecond and the laser spot travels a distance along the working surface corresponding to a length of the laser spot in a time period T less than about 100 microseconds. The method in accordance with one embodiment of the invention comprises the steps of:

periodically measuring an instantaneous power of the laser beam on a real-time basis using a power meter having a response time less than the acceleration time of the mirrors; and periodically sending a power control signal to the laser light source to regulate the power of the laser beam, the power control signal being a function of the measured instantaneous power.

In one embodiment, the instantaneous power of the laser beam is measured using a power meter having a response time less than about 0.3T. Thus, if the time period T required for the laser spot to travel its own length or diameter is, for example, equal to 100 µs, then the power meter has a response time less than about 30 µs. In one preferred embodiment of the invention, the instantaneous power of the laser beam is measured using a power meter having a response time less than about 10 µs, more preferably less than about 5 µs, and still more preferably less than or equal to about 2 µs.

It is too much to expect a fast power meter of the type described above to maintain an accurate calibration for an extended period of time. Accordingly, in another embodiment of the invention, there is provided a method of controlling laser power comprising the steps of:
- periodically measuring an instantaneous power of the laser beam on a real-time basis using a first power meter having a response time less than the acceleration time of the mirrors;
- regulating operation of the laser light source in real time based on the measured instantaneous power of the laser beam; and
- calibrating the first power meter on a periodic basis using a second power meter having a response time greater than that of the first power meter.

For example, the second (slow) power meter may have a response time greater than one millisecond up to about one second or more.

The invention in yet another embodiment encompasses using a digital signal processor (DSP) to regulate operation of the laser light source in real time based on digitized data representing at least the measured instantaneous power of the laser beam. The DSP may be operated in a feedback mode wherein the DSP determines a power error between a desired power of the laser beam and the measured instantaneous power of the laser beam, and regulates the laser light source in real time to drive the power error toward zero. The DSP in another embodiment deduces an instantaneous scanning velocity of the laser beam on a real-time basis from digitized data representing the positions of the mirrors versus time, and the desired power is determined based on the scanning velocity. Alternatively, the digital signal processor can determine an exposure error between a desired exposure of the heat-fusible material to the laser beam and an actual exposure calculated based on the measured instantaneous power and the scanning velocity, and can regulate the laser light source in real time to drive the exposure error toward zero.

The invention in still another aspect provides a method for tuning a laser light source in a rapid-prototyping system. The method comprises the steps of:
- scanning the laser beam along at least one vector on the working surface;
- at each of a plurality of sequential times during the scanning of the laser beam along the at least one vector, measuring an instantaneous position of each of the mirrors and deducing an instantaneous position of the laser beam on the working surface at each of said plurality of sequential times;
- at each of said plurality of sequential times, measuring an instantaneous power of the laser beam using a power meter, such that power versus position data are derived along the at least one vector;
- calculating exposure of the heat-fusible material to laser energy based on the power versus position data, such that calculated exposure versus position data are derived; and
- tuning the laser light source based on the calculated exposure versus position data.

In one embodiment, the tuning step is performed remotely via a computer communications network. For instance, an operator located far from the rapid-prototyping apparatus can, via the Internet for example, analyze the exposure versus position data and can then send tuning parameters via the Internet to the laser power controller for tuning the laser power control algorithms. In an alternative embodiment, the tuning can be performed automatically by predetermined algorithms that analyze the exposure versus position data and determine optimum tuning parameters.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings in which some, but not all, embodiments of the inventions are shown. Indeed, these inventions may be embodied in many different forms and should not be construed as limited to the embodiments set forth herein; rather these embodiments are provided so that this disclosure will satisfy applicable legal requirements. Like numbers refer to like elements throughout.

As will become apparent from the following description, the present invention may be utilized in connection with laser control systems generally, regardless of the particular application of the laser to be controlled. However, it has been observed that the present invention is particularly beneficial when applied to rapid prototyping systems that utilize lasers in the fabrication of articles from computer-aided-design (CAD) or computer-aided-manufacturing (CAM) databases. Accordingly, the following description will be directed to such a rapid prototyping system, specifically a selective laser sintering system; based on the foregoing, however, it is to be understood that the present invention may be used in other types of rapid prototyping systems (e.g., stereolithography and LOM systems) as well as other uses of laser energy.

Figure 1:
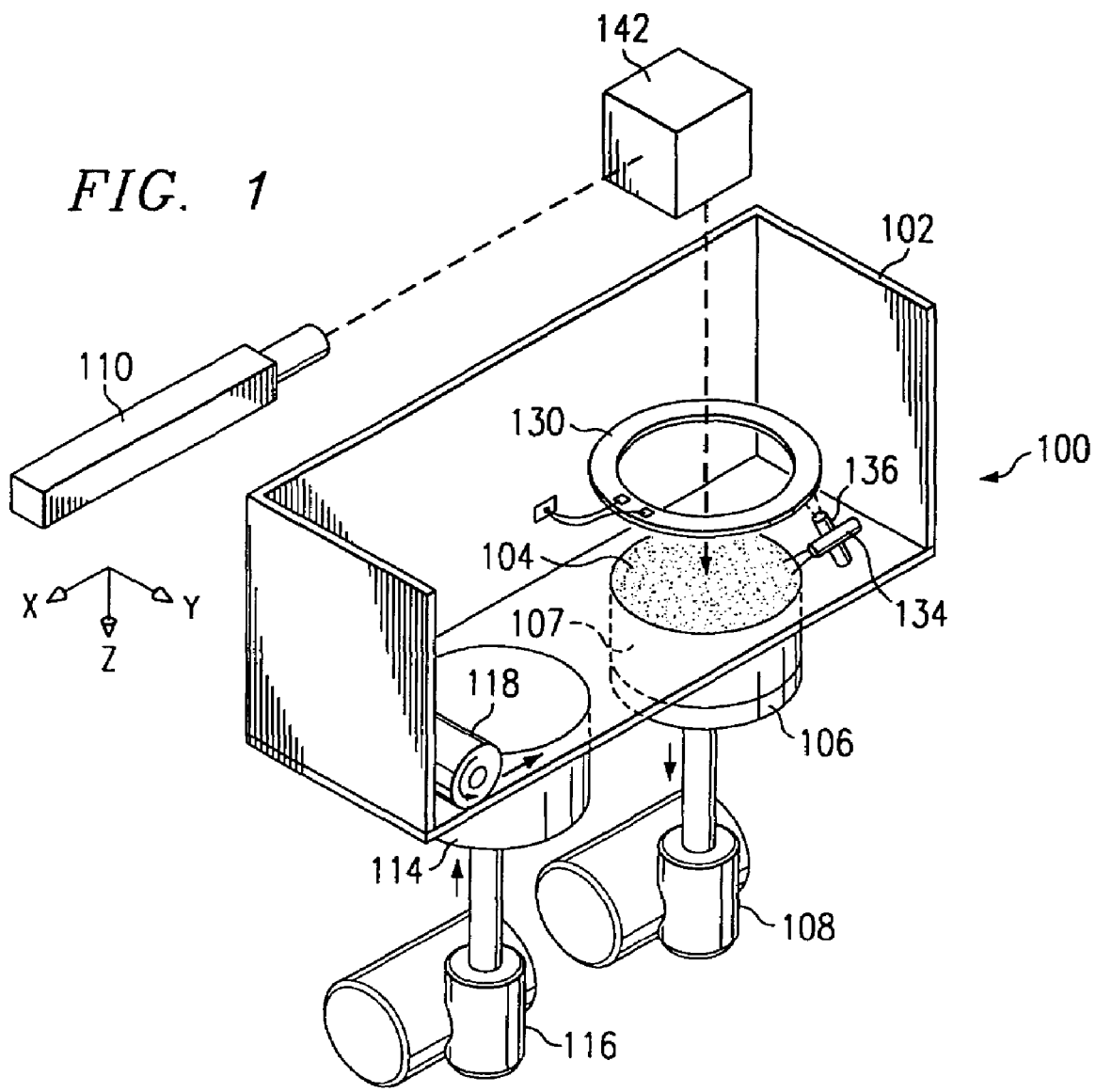
FIG. 1 is a perspective cutaway and schematic view of a laser sintering system according to one embodiment of the invention.

Referring first to FIG. 1, the construction and operation of a selective laser sintering system, indicated generally by the numeral 100, will be described for purposes of explanation of the preferred embodiments of the present invention. As shown in FIG. 1, selective laser sintering system 100 includes a process chamber 102 (the front doors and top of chamber 102 not shown in FIG. 1, for purposes of clarity). Chamber 102 maintains the appropriate temperature and atmospheric composition (typically an inert atmosphere such as nitrogen) for fabrication of the article therein.

The powder delivery system in system 100 includes feed piston 114, controlled by motor 116 to move upwardly and lift a volume of heat-fusible (i.e., sinterable) powder into chamber 102. Part piston 106, controlled by motor 108, moves downwardly below the floor of chamber 102 by a small amount, for example 5 mils, to define the thickness of each layer of powder to be processed. Roller 118 is a counter-rotating rotating roller that translates powder from feed piston 114 to target surface 104. Target surface 104, for purposes of the description herein, refers to the top surface of heat-fusible powder (including portions previously sintered, if present) disposed above part piston 106; the sintered and unsintered powder disposed on part piston 106 will be referred to herein as part cake 107.

As described in U.S. Pat. No. 5,017,753, roller 118 (preferably provided with a scraper to prevent buildup, such a scraper not shown in FIG. 1 for clarity) spreads the powder within chamber 102 across the powder bed and over target surface 104 by its translation from feed piston 114 toward and across target surface 104 at the surface of part cake 107 above part piston 106. It is preferable, for smooth and thorough distribution of the powder, that the amount of powder provided by feed piston 114 be greater than that which can be accepted at the surface of powder bed, so that some excess powder will result from the motion of roller 118 across target surface 104; this may be accomplished by the raising of feed piston 114 above the floor of chamber 102 by a greater distance that the distance below the floor of chamber 102 that part piston 106 is lowered (e.g., 10 mils versus 5 mils). It is also preferable to slave the counter-rotation of roller 118 to the translation of roller 118 within chamber 102, so that the ratio of rotational speed to translation speed is constant. It may be preferred to provide two powder pistons 114 on either side of part piston 106, for purposes of efficient and flexible powder delivery.

It is to be noted that although the laser sintering system 100 is illustrated herein with only a single feed piston 114, two feed pistons on opposing sides of the part cake 104 could be equally well employed to feed powder from both sides of the process chamber, thereby accelerating the building process. Additionally the present invention could equally well be utilized with a powder feed system employing an overhead feed system with a hopper depositing fresh powder directly onto the powder bed floor and a doctor blade to spread the powder across the powder bed. The overhead powder feed system could also deposit fresh powder on top of the counter-rotating roller as illustrated in co-pending U.S. patent application Ser. No. 10/856,303 assigned to the assignee of the present invention.

Figure 2:
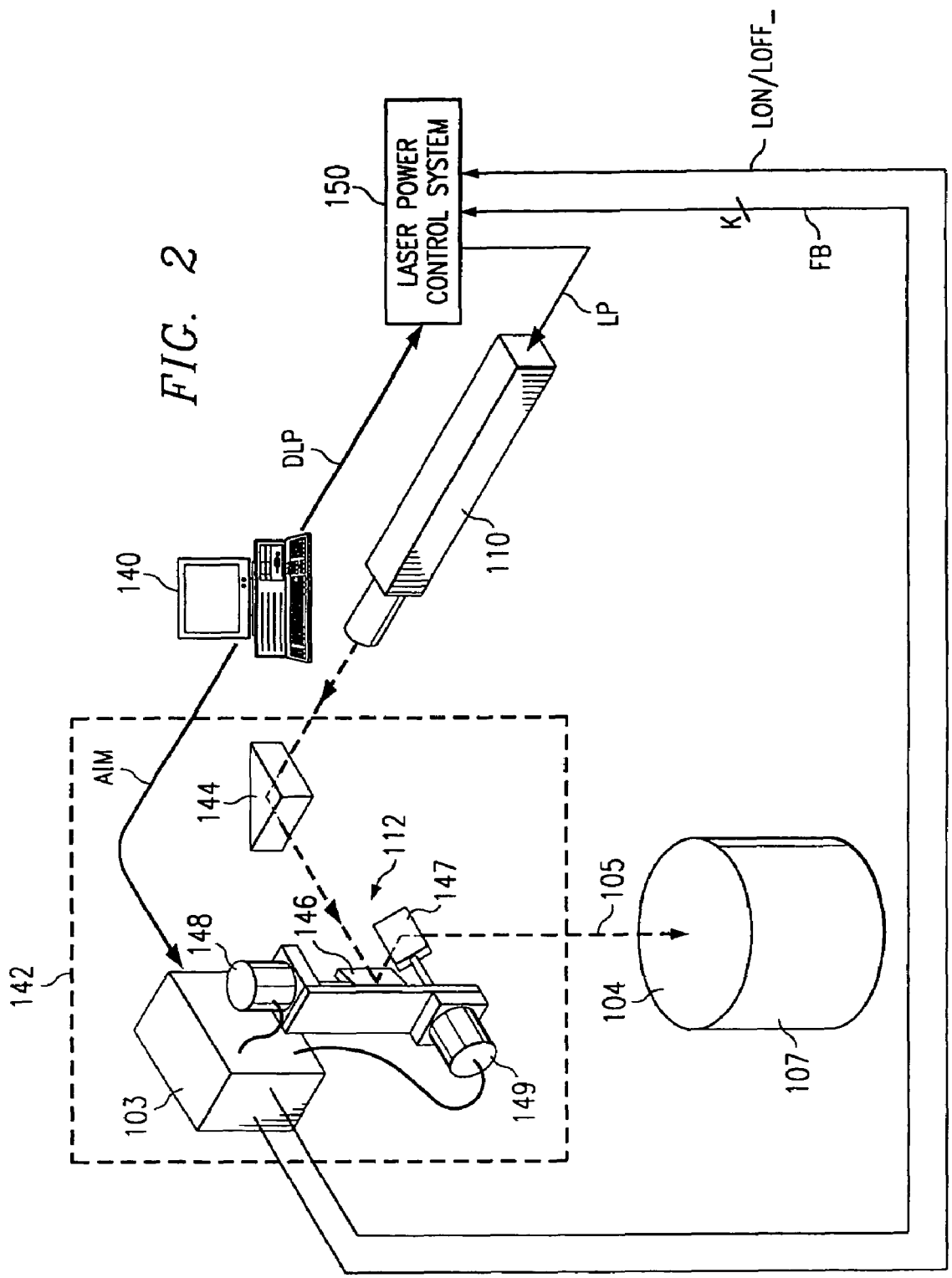
FIG. 2 is a perspective cutaway and schematic view of a laser control system according to one embodiment of the invention.

Fabrication of a cross-section of the desired article or articles is effected by laser 110, which provides a beam which is directed by scanning system 142 in the manner described in the U.S. Patents referred to hereinabove and as will now be described relative to FIG. 2. Laser 110 includes, in addition to a laser itself, such conventional control elements as described in U.S. Pat. No. 4,863,538, including for example a front mirror assembly, and focusing elements such as diverging and converging lenses. The type of laser 110 used depends upon many factors and in particular upon the type of powder that is to be sintered. For many types of conventional powders, a preferred laser is a 50 watt $CO_2$ type laser with controllable power output. Laser 110, when on, emits laser beam 105 that travels generally along the path shown by the arrows in FIG. 2.

Computer 140 and scanning system 142 are included for controlling the direction of the laser beam 105 as it impinges target surface 104. In this preferred embodiment of the invention, computer 140 includes a controlling microprocessor for scanning system 142 and further includes a system for storing the CAD/CAM data base, in slice-by-slice form, to define the dimensions of the article or articles being produced. A conventional personal computer workstation, such as a personal computer based on a Pentium-class microprocessor and including floating point capabilities, is suitable for use as computer 140 in the preferred embodiment of the invention. Computer 140 generates signals on lines AIM to scanner processor 103, in scanning system 142, to direct laser beam 105 across target surface 104 according to the cross-section of the article to be produced in the current layer of powder.

Scanning system 142 includes prism 144 for redirecting the path of travel of laser beam 105; the number of prisms 144 necessary for directing laser beam 105 to the proper location is based on the physical layout of the apparatus. Alternatively, as is well known in the art, one or more fixed mirrors can be used in place of prism 144 for directing laser beam 105, depending upon the particular layout of system 100. Scanning system 142 further includes a pair of mirrors 146, 147, which are driven by respective rotary motive devices such as galvanometers 148, 149. Galvanometers 148, 149 are coupled to their respective mirrors 146, 147 to selectively orient the mirrors 146, 147 and control the aim of laser beam 105. Galvanometers 148, 149 are mounted perpendicularly to one another so that mirrors 146, 147 are mounted nominally at a right angle relative to one another. Scanner processor 103 in scanning system 142 controls the movement of galvanometers 148, 149 to control the aim of laser beam 105 within target surface 104, in response to the signals on lines AIM from computer 140 that are generated according to the CAD/CAM data base stored therein that defines the cross-section of the article to be formed in the layer of powder at target surface (also referred to herein as the "working surface") 104.

In addition, computer 140 generates signals to laser power control system 150 on line DLP to indicate the desired level of power to be delivered by laser 110 when on. Scanner processor 103 generates signals on line LON/LOFF_indicating the times at which laser 110 is to be turned on or off according to the CAD/CAM data base representation of the slice of the article for the current layer of powder. According to the preferred embodiments of the invention, the signals on line LON/LOFF_, in combination with feedback signals on one or more lines FB generated by scanner processor 103, controls laser power control system 150 to produce a time-varying signal to laser 110 on line LP corresponding to the instantaneous power to be delivered. As described in U.S. Pat. No. 6,085,122, incorporated herein by reference, the feedback signals on lines FB may include an indication of the position or velocity of galvanometers 148, 149 (and thus mirrors 146, 147), for use in controlling laser 110. As will become apparent from the following description, the scanner processor 103 and the laser power control system 150 according to the preferred embodiments of the present invention control the scanning of the laser beam and the power of the laser 110 to achieve a desired exposure of the powder to the laser energy. While laser power control system 150 is illustrated as a separate component in FIG. 2, laser power control system 150 may of course be implemented within computer 140 or scanner processor 103, if desired.

Laser Scanning Control

Figure 3:
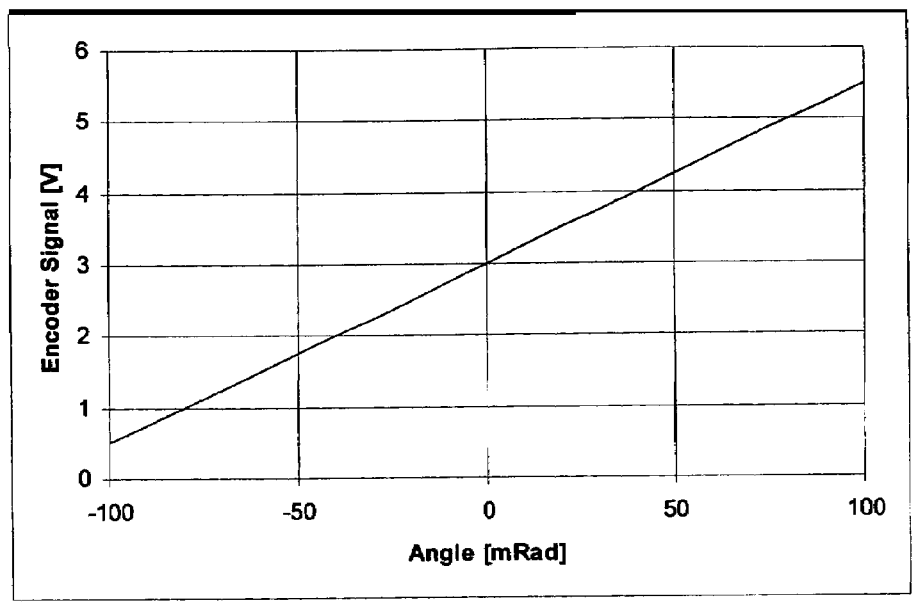
FIG. 3 is a graph of a typical capacitive encoder voltage versus angular position response curve.

As noted, it is desirable for the scanning and power control to know the actual positions of the mirrors during vector scanning. Accordingly, angular encoders (not visible in the drawings) are used to measure the change in angle of each of the galvanometer shafts. Conventionally, special capacitors are used as angular encoders. As the angle of the shaft changes, the capacitance will change somewhat linearly with the angle. FIG. 3 shows a typical capacitive encoder response as a function of shaft angle and thus also of angle of scanning mirror that is steering the laser spot. The encoder circuitry converts the values of capacitance values to voltages shown in FIG. 3. In addition to capacitive encoders, optical encoders are sometimes applied as angular encoders. Optical encoders have a similar encoder response curve as the one shown in FIG. 3.

The monotonic response of voltage versus angle shown in FIG. 3 leads to problems in high-speed, high-resolution applications. In typical high-resolution scanner applications, 5 µRad angular resolution is expected. From FIG. 3, it can be seen that 5 µRad angular resolution corresponds to a 125 µV change in encoder signal. Thus, in order to achieve a high angular resolution, the encoder electronics must be able to separate voltage levels at about 100 µV accuracy. When the high resolution is combined with high speed, this 100 µV accuracy needs to be achieved in a few tens of microseconds. It is very difficult to design practical encoder circuitry that can resolve 100 µV in a few tens of microseconds. Thus, most commercial scanning systems are not able to measure the position of a scanning mirror to a high accuracy while the mirror is moving; the accuracy is achieved only when the mirror is stationary.

Figure 4:
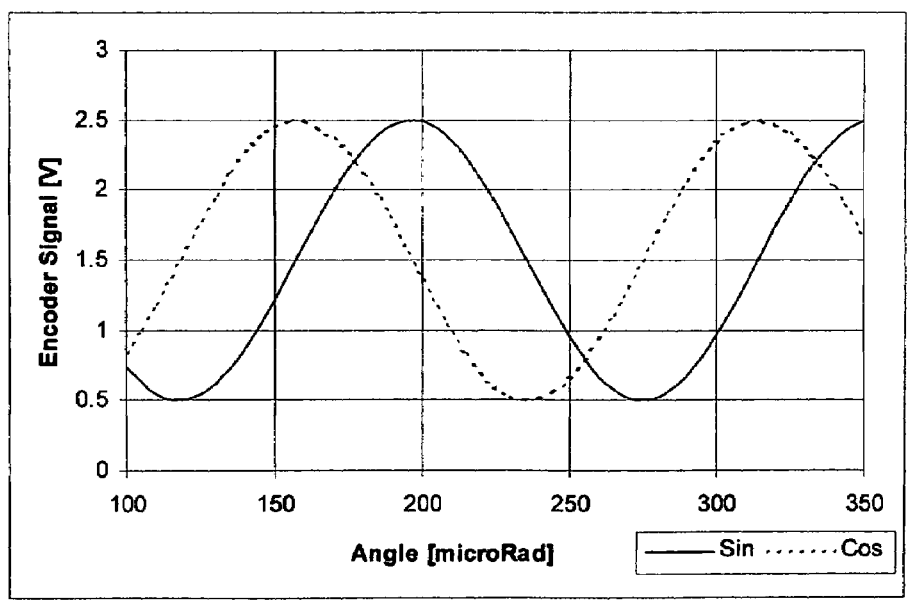
FIG. 4 is a graph of a voltage versus angular position response curve for an interferometric encoder as used in preferred embodiments of the invention.

In preferred embodiments of the present invention, interferometric encoders are used for measuring the positions of the scanning mirrors. The critical difference between the interferometric encoders and conventional capacitive encoders is that interferometric encoders do not have a monotonic response as in FIG. 3. Instead, the response is periodic as shown in FIG. 4. When the response is periodic, the total voltage available for measurement does not limit the slope of the response curve. For example, a 5 µRad angular resolution corresponds to a 200 mV difference in encoder signal. Differences such as 200 mV in encoder signals are relatively easy to measure even in a few tens of microseconds. Thus, high speed and accuracy can be achieved concurrently such that mirror positions can be measured while the mirrors are moving. It is also important to note that the periodic function needs to be complemented with another periodic function (e.g., sine and cosine as shown in FIG. 4), because the slope of a single periodic function is zero at certain values (such as at 195 µRad for the sine in FIG. 4) and the resolution becomes limited again.

As noted above, the scanner control system advantageously measures the mirror encoder positions every microsecond length period of time, such as 15 microseconds. In a laser sintering application, the mirrors tend to be relatively large (e.g., three times larger in linear dimensions than the scanning mirrors typically used in stereolithography applications). As a result, their moment of inertia is larger by a factor of about 20 to 40. Consequently, it takes much more time to accelerate these scanning mirrors to their full speed. Experimentally, it has been determined that it takes about 400 microseconds before the scanning mirrors reach their full velocity at the beginning of a vector. Likewise, in the simple case of drawing a single vector, the mirrors must be decelerated (i.e., accelerated with a negative value of acceleration) at the end of the vector as the laser spot comes to a stop at the end. In order to accurately control the laser position on the working surface, these acceleration periods (i.e., positive acceleration at the beginning and negative acceleration at the end) cannot be ignored.

Figure 5A:
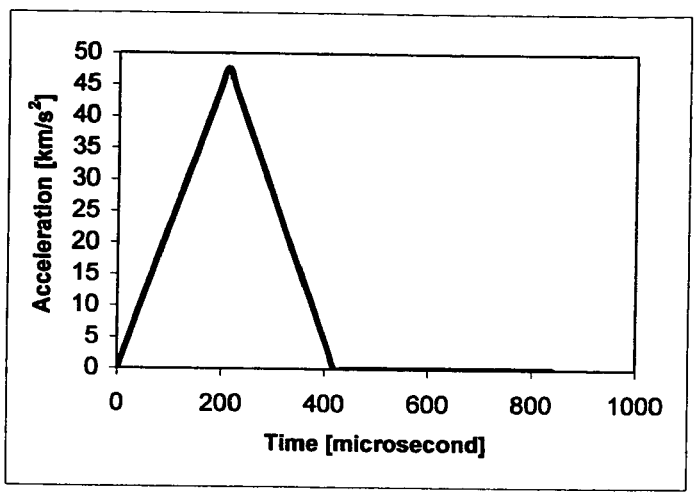
FIG. 5A is a plot of mirror acceleration versus time as modeled in accordance with one embodiment of the invention.
Figure 5B:
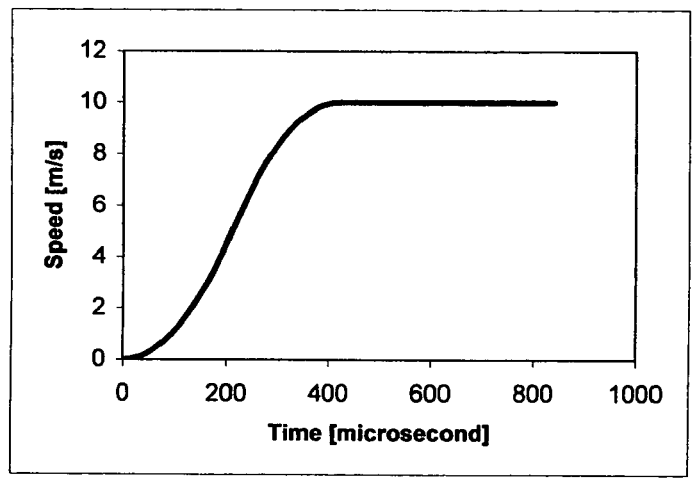
FIG. 5B is a plot of mirror speed versus time corresponding to the acceleration of FIG. 5A.
Figure 5C:
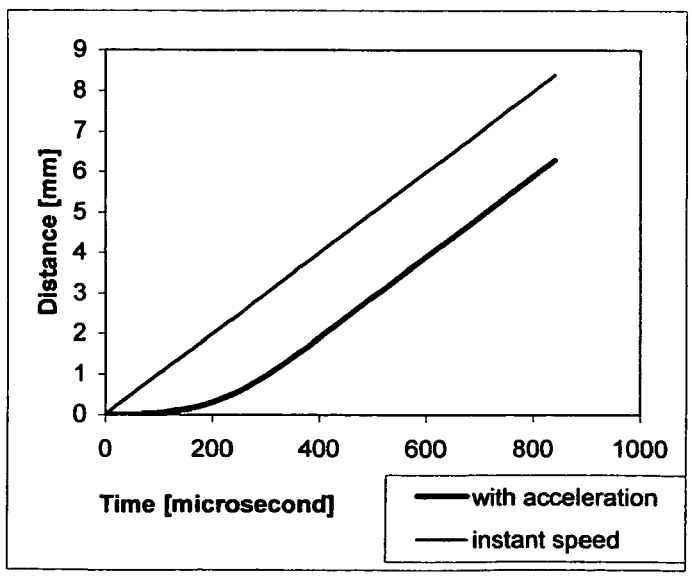
FIG. 5C is a plot of mirror position versus time corresponding to the acceleration of FIG. 5A, also comparing the position versus time obtained when acceleration to constant speed is assumed to be instantaneous.

It has been found that the acceleration period can be modeled and controlled very accurately if they are divided into 2 phases: linearly increasing acceleration magnitude and linearly decreasing acceleration magnitude. This limits the rate of change of acceleration. FIG. 5A shows a two-phase acceleration period (with positive acceleration causing increasing velocity) that is modeled in accordance with a preferred embodiment of the invention. As shown, it takes about 400 microseconds for the mirror to reach its full speed of 10 m/s. The position of the laser spot as a function of time, corresponding to the acceleration curve of FIG. 5A, is shown in FIG. 5C. For comparison, if it is assumed the change of speed is instantaneous (infinite acceleration) the second curve in FIG. 5C is obtained. Thus, it is apparent that if the acceleration phase is ignored, the actual position of the mirror is lagging the expected position by about 2 mm.

It will be understood that since the acceleration is negative at the end of a vector, the curve of FIG. 5A does not apply, but the acceleration curve instead has a mirror image to that of FIG. 5A. Thus, acceleration in the first phase would go from zero toward negative values at a linear rate, and then would go linearly back to zero.

In the laser scanning arrangement, the position signal measured by the encoders is preferably used in a feedback control system. If the position of the scanning mirror is not exactly what is commanded, an error signal is generated and additional control signals are applied to move the mirror toward the desired position. When the measured position of the mirror exactly matches the commanded position, the error is zero. If the acceleration period is ignored when commanded positions are determined, a position error will always be generated. From FIG. 5C, it is seen that for a 10 m/s scanning speed, a position error of about 2 mm will be generated. This error is often referred to as following error. The laser beam is actually not at the location where it is commanded. The laser beam is following the commanded location by 2 mm and it is constantly driven by feedback circuitry. The position error theoretically could be a lead or a lag of the measured position relative to the commanded position.

If only straight lines are to be drawn, the following error might not be much reason for concern. However, if the scanning mirrors are to draw with a full speed a non-linear feature that is smaller than the following error, the feature will disappear or be severely distorted. One way to get around this problem is to make the feature out of straight lines and stop at the end of each line for a sufficiently long time period for the following error to become zero. Unfortunately, small features are very slow to draw in this manner.

The present invention in some embodiments provides a scanning system that is able to physically model the acceleration and deceleration phases of the mirror movements. For example, an acceleration profile as shown in FIG. 5A can be mathematically modeled. It is important to note that the acceleration shown in FIG. 5A is a continuous function of time. Instantaneous changes in acceleration are impossible because of inductance of the scanning motor and inertia of the mirror. The acceleration profile of FIG. 5A can be made out of time intervals that always have a constant rate of change of acceleration, and can thus be written in the form $$a(t)=a_0+Jt,$$

where a(t) is the acceleration at time t, where t is measured from the beginning of the present interval, and $a_0$ is the value of acceleration in the beginning of that interval. In FIG. 5A, the function J is a piecewise linear function defined as:

$J=250\times10^6$ m/s³ during the time interval [T=0 to 210 μs];

$J=250\times10^6$ m/s³ during the time interval [T=210 μs to 420 μs]; and

J=0 during the time interval [T=420 μs to 840 μs], where T is measured from the beginning of the acceleration.

Thus, in the first time interval, acceleration is positive and is increasing at a linear rate with time, in the second interval the acceleration is still positive but is decreasing at a linear rate, and in the third interval the acceleration is zero (i.e., the mirror is at constant velocity). It will be understood that for a negative acceleration (i.e., deceleration) at the end of a vector, the value of J in the first interval is negative and the value of J in the second interval is positive.

The instantaneous velocity v(t) of the scanning mirrors is then given by:

$$v(t)=v_0+a_0t+(\tfrac{1}{2})J\, t^2,$$

where $v_0$ is in the velocity at the beginning of the present interval. Similarly the position x(t) of the scanning mirror at any instant of time is given by:

$$x(t)=x_0+v_0t+(\tfrac{1}{2})a_0t^2+(\tfrac{1}{6})J\, t^3,$$

where $x_0$ is the position at the beginning of the present interval.

By applying the above equations to the acceleration and deceleration phases of the mirrors, the drawing of the whole vector can be analytically described with exact formulas for accelerations, velocities, and positions. Moreover, every vector that needs to be drawn can be pre-analyzed before scanning even begins, and can be drawn at the optimal speed by varying the duration of the constant velocity interval, by varying the values of J in the beginning and end of the vector, and by varying the durations of the acceleration and deceleration phases.

The pre-analyzed and optimized vectors are then applied to the scanning system. The scanning processor 103 includes a memory in which are stored the values of J and the time intervals to which they apply, for each vector to be drawn. Prior to or during scanning, the expected positions of the mirror encoders at every time step (typically about 10 to 15 microseconds) are calculated by the processor 103, based on the physical mathematical model. During scanning, the measured positions for every time step from the scanner encoders are then compared to the expected positions and a feedback algorithm is applied in order to keep the position errors minimal at all times.

When a plurality of vectors to be sequentially scanned are pre-analyzed in this manner, in one embodiment of the invention, vectors having a length greater than a predetermined value are analyzed using a different physical mathematical modeling from that used for vectors having a length less than the predetermined value. For example, in the case of a scanning system in which the mirror final speed is 10 m/s, it may take a movement of the laser spot of about one millimeter on the working surface for the mirror to accelerate to this full speed, and accordingly for a vector two millimeters long, for instance, the laser spot would never reach its full, constant speed. Thus, the model used for such short vectors assumes that there is no constant-velocity phase of movement of the mirrors. Instead, there is an initial phase of positive acceleration followed immediately by a second phase of negative acceleration. However, for longer vectors wherein there is a constant-velocity phase, the modeling can be as previously described.

The scanning processor 103 in preferred embodiments of the invention comprises a digital signal processor (DSP). The position signals from the encoders are digitized, and the position feedback control is implemented by the DSP in the digital domain. The commanded-position signals sent to the galvanometers by the DSP in some cases may contain frequencies that could excite resonances of the mirrors. To avoid this, advantageously the digital signal processor employs filtering (e.g., so-called "notch filters") to remove frequencies tending to excite resonances of the mirrors.

Figure 6:
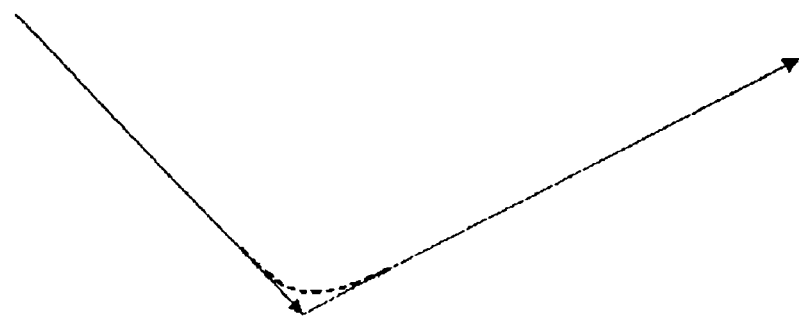
FIG. 6 is a diagrammatic view showing a plurality of sequential vectors to be scanned, with smooth transitions between the vectors in accordance with another embodiment of the invention.

It will be appreciated that at the sharp corner formed by the juncture of two sequential non-collinear vectors, if the laser spot does not come to a complete stop at the corner, the instantaneous acceleration (i.e., the acceleration vector) at the corner would have an infinite magnitude. This, of course, cannot physically occur because of the inertia of the scanning system; accordingly, conventionally it is necessary to bring the laser spot to a stop at the end of each vector. In accordance with another embodiment of the invention, however, the laser spot is scanned along a smooth curve from one vector to a subsequent vector. The smooth curve is tangent to both vectors and connects a point on the first vector ahead of the "nominal" first vector end point (which is also the "nominal" starting point of the second vector) to a point on the second vector after the nominal starting point of the second vector. This is schematically illustrated in FIG. 6, where the dashed line represents the smooth curve. The smooth curve advantageously is a third-order polynomial (sometimes referred to as a spline). Suitable splines can be calculated prior to scanning by analyzing the vectors, and the splines can be stored in the memory of the scanning processor 103.

The use of the splines allows the laser spot to avoid coming to a complete stop before drawing the next vector. The laser spot can move continuously from one vector to the next, and the acceleration is always finite because there is never any instantaneous change in direction of the scanning mirrors.

Laser Power Control

Another aspect of the invention, as noted, is the control of the laser power. Generally, there is an optimum exposure that is desired for each region of a part being fabricated in the rapid-prototyping apparatus. As previously described, the desired exposure may be uniform for all regions, or may be non-uniform, depending upon the particular instance. The exposure is defined as the laser energy delivered to the fusible material per unit area. Thus, it can be recognized that the exposure depends primarily upon the laser power and the speed of the laser spot; more particularly, the exposure is proportional to power and inversely proportional to speed.

Figure 7:
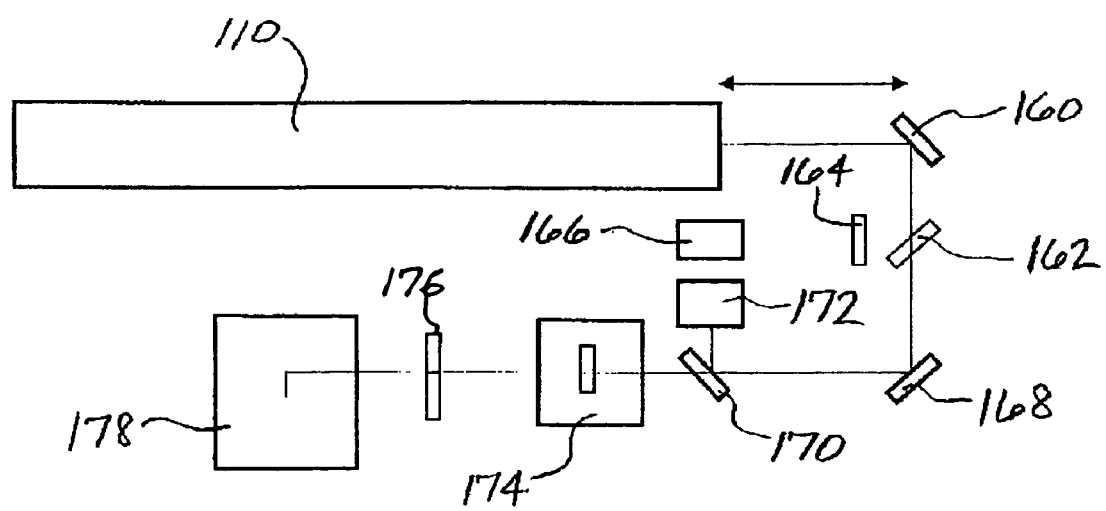
FIG. 7 is a functional block diagram of a laser power control system according to an embodiment of the invention.

In accordance with the present invention, the exposure can be controlled accurately through the use of a fast power meter for measuring instantaneous laser power during a scan of a vector or plurality of sequential vectors. A schematic diagram of a laser scanner with power control in accordance with an embodiment of the invention is shown in FIG. 7. The scanner has a laser 110 and a high-reflector mirror 160 that re-directs the laser beam to a beam-splitter 162, which splits the beam and directs a small fraction of the beam intensity (e.g., the beam-splitter can have about 1% reflectivity and 99% transmissivity) through a focusing lens 164 onto a fast power meter 166 operable to measure the power of the beam in rapid fashion. The fast power meter can be, for example, a fast-response photodetector or the like. An exemplary fast power meter is Model PD-TE-10.6-3 made by Vigo Systems S.A. of Warsaw, Poland. The fast power meter has a response time less than the acceleration period of the scanning mirrors. More preferably, the response time is less than the period of time it takes for the laser spot (when moving at full speed) to travel its own length or diameter on the working surface. For instance, where the laser spot is 0.1 mm across and the spot moves at 10 m/s, the time required to travel the spot length is 10 µs. Accordingly, the fast power meter preferably has a response time less than 10 µs, more preferably less than 5 µs, still more preferably less than 3 µs, and even more preferably about 2 µs or less. In other applications where the time period to travel the spot length is different from 10 µs, the response time of the fast power meter can be different. As a rule of thumb, it is desirable for the response time to be less than 0.3T, where T is the period of time it takes for the laser spot (when moving at full speed) to travel its own length or diameter on the working surface.

The other portion of the beam is directed from the beam-splitter 162 to a high-reflector mirror 168, which re-directs the beam through a linear translator and concave beam expander lens 174 and a convex beam expander lens 176 to the scanning mirrors 178 (shown only diagrammatically). Adjacent the path of the beam from the mirror 168 to the scanning mirrors, an on/off high-reflector mirror 170 is arranged with a suitable actuator (not shown) for moving the mirror 170 into the path of the beam or out of the path of the beam. When moved into the beam path, the mirror 170 re-directs the beam to a slow power meter 172 operable to measure the power of the beam.

In accordance with this aspect of the invention, the fast power meter 166 is calibrated to provide a signal from which the power of the laser beam to which the fusible material on the working surface is exposed can be determined, for example through a calibration curve or the like. At each tick time or time step of the laser power controller 150, during the scanning of a vector, the fast power meter can be used to measure the instantaneous power of the laser beam, and the power measurements can be stored in memory for each point along the vector. As previously described, the encoder positions at these points are detected and stored, and the laser spot velocities at the points can also be calculated and stored. From the velocities and power measurements, the exposure of the fusible material can be deduced at each point. This power, position, and exposure data can be used in a number of different ways to facilitate improved exposure control during vector scanning.

For example, in one embodiment of the invention, a digital signal processor of the laser power controller 150 can regulate the laser 110 (see briefly FIG. 2) real time during scanning based on the measured instantaneous power at each point along the vector, so as to achieve a desired exposure at each point. As one illustrative example, a desired exposure can be determined for the various regions of a part to be built. Then, based on the velocities of the laser at each point and the measured instantaneous power at each point, the actual exposure for each point can be deduced by the DSP. The DSP can implement a closed-loop control of the laser power in real time so as to drive an exposure error (i.e., the difference between the desired exposure and the actual exposure) toward zero.

However, the invention is not limited to such closed-loop control techniques. For instance, one alternative embodiment of the invention entails determining laser power tuning parameters in advance of vector scanning to build a part. Toward this end, a tuning method in accordance with the invention involves scanning one or more vectors, and preferably a plurality of vectors of various lengths, with a particular set of laser power tuning parameters (e.g., a predetermined relationship between laser power and spot velocity), and deducing the actual exposure versus position at the various points along each vector generally as described above. The exposure versus position can then be plotted and analyzed to determine whether and to what extent the laser power tuning parameters should be altered. As an example, if the exposure versus position plot shows that the ends of the vectors are overexposed, then the tuning parameters can be adjusted so that the exposure in the end regions is reduced. The process can then be repeated with the new tuning parameters and the exposure versus position plot can be reexamined to determine whether further changes are needed.

This process can be done "manually" by a worker who examines the plots and determines the parameters changes needed. Alternatively, the tuning can be automated through the use of tuning algorithms built into the DSP. In automatic tuning, the DSP calculates new laser power control parameters based on the calculated exposure versus position and the desired exposure versus position data. For example, as described in U.S. Pat. No. 6,151,345, incorporated herein by reference, one laser power control parameter that can be tuned is the duration of a "stretched" initial pulse of the laser. The duration of the initial pulse can be related to the length of the laser "off" time, and can be calculated in the DSP.

In yet another embodiment of the invention, the tuning can be accomplished remotely by an operator using a computer workstation or terminal at a site remote from the rapid prototyping apparatus, via a network such as the Internet. More particularly, a data file containing the calculated actual exposure versus position data from a tuning run of the apparatus can be transmitted electronically from the DSP over the network to the remote terminal. The operator of the terminal can manually determine new laser power control parameters, or can use software to accomplish this task, and then a data file containing new laser power control parameters can be transmitted to the laser power controller or DSP via the network.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for vector-scanning a laser beam, comprising the steps of:
   directing a laser beam from a laser light source onto a scanning system comprising a first mirror coupled with a first rotary motive device for positioning the first mirror, the laser beam being directed from the first mirror onto a second mirror of the scanning system and then onto a working surface, the second mirror being coupled with a second rotary motive device for positioning the second mirror; and
   scanning the laser beam along a vector by providing a commanded-position signal to each of the first and second rotary motive devices to rotate the respective mirrors, each mirror undergoing acceleration at the beginning and end of the vector, wherein the commanded-position signals are calculated based on physical mathematical modeling of the acceleration of the mirrors taking into account effects of inertia of the scanning system.

2. The method of claim 1, wherein the mathematical modeling comprises modeling the acceleration of each of the mirrors as having an increasing magnitude during a first time interval, and a decreasing magnitude during a second time interval following the first time interval.

3. The method of claim 2, wherein the acceleration of each mirror is modeled as having an increasing magnitude at a predetermined first rate during the first time interval and as having a decreasing magnitude at a predetermined second rate during the second time interval.

4. The method of claim 3, wherein the acceleration of each mirror is modeled as having a zero magnitude during a third time interval following the second time interval.

5. The method of claim 3, wherein the predetermined first rate is constant throughout the first time interval, and the predetermined second rate is constant throughout the second time interval.

6. The method of claim 1, wherein the acceleration of each mirror is modeled according to the equation $a(t)=a_0+Jt,$ where $a(t)$ is the acceleration at time t, $a_0$ is the acceleration at time t=0, and J is a predetermined function whose magnitude varies during the acceleration of the mirror.

7. The method of claim 6, wherein J has a first function definition during a first time interval of the acceleration and a second function definition during a subsequent second time interval of the acceleration.

8. The method of claim 6, wherein J has a third function definition during a third time interval following the second time interval.

9. The method of claim 8, wherein J is defined as $$J = \begin{cases} J_1 \text{ for } 0 \le T < T_1 \\ J_2 \text{ for } T_1 \le T < T_2 \\ 0 \text{ for } T_2 \le T \end{cases}$$

where T is the elapsed time from the beginning of the acceleration, $J_1$ and $J_2$ are numerical constants, and $T_1$ and $T_2$ are predetermined time values.

10. The method of claim 9, wherein $J_1$ is a positive number and $J_2$ is a negative number.

11. The method of claim 10, wherein $J_1$ and $J_2$ have substantially equal absolute values.

12. The method of claim 9, further comprising the step of analyzing a vector before the vector is scanned so as to calculate values for $J_1$ and $J_2$ and for $T_1$ and $T_2$.

13. The method of claim 12, wherein a plurality of different vectors are scanned and, prior to each vector being scanned, values for $J_1$ and $J_2$ and for $T_1$ and $T_2$ are calculated, wherein said values vary from one vector to another.

14. The method of claim 13, wherein the values for $J_1$ and $J_2$ and for $T_1$ and $T_2$ are calculated for all vectors to be scanned prior to the first vector being scanned.

15. The method of claim 6, further comprising the steps of calculating a predicted velocity of each mirror according to the equation $v(t)=v_0+a_0t+\tfrac{1}{2}Jt^2$ and calculating a predicted position of each mirror according to the equation $$x(t) = x_0 + v_0 t + \frac{1}{2}a_0 t^2 + \frac{1}{6}Jt^3$$

where $v(t)$ and $x(t)$ are respectively the predicted velocity and position of the mirror at time t, and $v_0$ and $x_0$ are respectively the velocity and position of the mirror at time t=0.

16. The method of claim 15, wherein J is defined as $$J = \begin{cases} J_1 \text{ for } 0 \le T < T_1 \\ J_2 \text{ for } T_1 \le T < T_2 \\ 0 \text{ for } T_2 \le T \end{cases}$$

where T is the elapsed time from the beginning of the acceleration, $J_1$ and $J_2$ are numerical constants, and $T_1$ and $T_2$ are predetermined time values.

17. The method of claim 15, further comprising the steps of:
   periodically measuring an actual position of each mirror at each of a plurality of sequential time steps during the scanning of a vector;
   calculating the predicted position of each mirror at each time step;
   calculating a position error between the actual position and the predicted position of each mirror at each time step; and
   using a feedback control scheme to drive the position error at each time step toward zero.

18. The method of claim 1, further comprising the steps of:
   periodically measuring an actual position of each mirror using an interferometric encoder at each of a plurality of sequential time steps during the scanning of a vector;
   calculating a predicted position of each mirror at each time step based on the physical mathematical modeling of the scanning system;
   calculating a position error between the actual position and the predicted position of each mirror at each time step; and
   using a feedback control scheme to drive the position error at each time step toward zero.

19. The method of claim 18, wherein the predicted position of each mirror is calculated according to the equation $$x(t) = x_0 + v_0 t + \frac{1}{2}a_0 t^2 + \frac{1}{6}Jt^3$$

where x(t) is the predicted position of the mirror at time t, and $x_0$, $v_0$, and $a_0$ are respectively the position, velocity, and acceleration of the mirror at time t=0, and wherein J is a predetermined function whose magnitude varies during an acceleration phase of the mirror.

20. The method of claim 1, wherein a plurality of vectors to be sequentially scanned are analyzed prior to scanning, wherein vectors having a length greater than a predetermined value are analyzed using a different physical mathematical modeling from that used for vectors having a length less than said predetermined value.

21. The method of claim 20, wherein the physical mathematical modeling of vectors having a length greater than said predetermined value takes into account a constant-velocity phase of movement of the mirrors.

22. The method of claim 20, wherein the physical mathematical modeling of vectors having a length less than said predetermined value assumes that the mirrors are accelerated and then decelerated with no intervening constant-velocity phase of movement of the mirrors.

23. The method of claim 1, wherein a digital signal processor is employed to control the positions of the mirrors based on measured actual positions of the mirrors that are digitized, the control taking place in the digital domain.

24. The method of claim 23, wherein the commanded-position signals are sent to the rotary motive devices at a periodic frequency, and wherein the digital signal processor employs filtering to remove frequencies of said signals tending to excite resonances of the mirrors.

25. A method for vector-scanning a laser beam to sequentially scan a series of vectors, comprising the steps of:
    directing a laser beam from a laser light source onto a scanning system comprising a first mirror coupled with a first rotary motive device for positioning the first mirror, the laser beam being directed from the first mirror onto a second mirror of the scanning system and then onto a working surface, the second mirror being coupled with a second rotary motive device for positioning the second mirror;
    scanning the laser beam along a first vector by providing a commanded-position signal to each of the first and second rotary motive devices to rotate the respective mirrors, and subsequently scanning the laser beam along a second vector that is non-collinear with the first vector;
    wherein the mirrors are controlled to scan the laser along a smooth curve between the first vector and the second vector, the smooth curve being tangential to each of the vectors, without stopping and so as to avoid instantaneous changes in direction of the laser.

26. The method of claim 25, wherein the smooth curve comprises a third-order polynomial.

27. A method for vector-scanning a laser beam on a working surface in a rapid-prototyping system, comprising the steps of:
    directing a laser beam from a laser light source onto a scanning system comprising a first mirror coupled with a first rotary motive device for positioning the first mirror, the laser beam being directed from the first mirror onto a second mirror of the scanning system and then onto the working surface to form a laser spot thereon, the second mirror being coupled with a second rotary motive device for positioning the second mirror;
    scanning the laser beam along a vector by providing a commanded-position signal to each of the first and second rotary motive devices to rotate the respective mirrors, each mirror undergoing acceleration at the beginning of the vector, wherein the commanded-position signals are calculated based on physical mathematical modeling of the acceleration of the mirrors taking into account effects of inertia of the scanning system, and wherein actual positions of the mirrors are measured and digital feedback control of the mirror positions is employed at a periodic rate sufficiently small to maintain a following error of the laser spot less than about 200 µs at all times.

28. The method of claim 27, wherein the following error of the laser spot is maintained less than about 100 µs at all times.

29. The method of claim 28, wherein the following error of the laser spot is maintained less than about 50 µs at all times.

30. A method for tuning a laser light source in a rapid-prototyping system wherein the laser light source creates a laser beam and the laser beam is vector-scanned by a scanning system along a working surface of a heat-fusible material, the scanning system comprising a first mirror coupled with a first rotary motive device for positioning the first mirror, the laser beam being directed from the first mirror onto a second mirror of the scanning system and then onto the working surface to form a laser spot thereon, the second mirror being coupled with a second rotary motive device for positioning the second mirror, the method comprising the steps of:
    scanning the laser beam along at least one vector on the working surface;
    at each of a plurality of sequential times during the scanning of the laser beam along the at least one vector, measuring an instantaneous position of each of the mirrors and deducing an instantaneous position of the laser beam on the working surface at each of said plurality of sequential times;
    at each of said plurality of sequential times, measuring an instantaneous power of the laser beam using a power meter, such that power versus position data are derived along the at least one vector;
    calculating exposure of the heat-fusible material to laser energy based on the power versus position data, such that calculated exposure versus position data are derived; and
    tuning the laser light source based on the calculated exposure versus position data.

31. The method of claim 30, wherein the tuning step comprises comparing the calculated exposure derived for at least one position along the at least one vector to a predetermined exposure level and regulating the laser light source to adjust the laser power based on a difference between the calculated exposure and the predetermined exposure level.

32. The method of claim 30, wherein the tuning step is performed remotely via a computer communications network.

33. The method of claim 30, wherein the tuning step is performed automatically in a computer controller based on predetermined tuning algorithms.

34. The method of claim 25, wherein the commanded-position signals are sent to the rotary motion devices at a periodic frequency, and wherein a digital signal processor employs filtering to remove frequencies of said signals tending to excite resonances of the mirrors.

35. The method of claim 27, wherein the commanded-position signals are sent to the rotary motion devices at a periodic frequency, and wherein a digital signal processor employs filtering to remove frequencies of said signals tending to excite resonances of the mirrors.

36. The method of claim 30, wherein commanded-position signals are sent to the rotary motive devices at a periodic frequency, and wherein a digital signal processor employs filtering to remove frequencies of said signals tending to excite resonances of the mirrors.

* * * * *